United States Patent [19]
Drexel et al.

[11] Patent Number: 5,298,849
[45] Date of Patent: Mar. 29, 1994

[54] ARRANGEMENT AND METHOD FOR CHARGING AN ACCUMULATOR OF A TRANSPORTING DEVICE COMPRISING AN INDIVIDUAL ELECTRIC DRIVE

[75] Inventors: Peter Drexel, Steinenbronn; Rainer Utz; Hans Erne, both of Waiblingen; Stefan Reitmeier, Waiblingen-Hohenacker; Ulrich Mueller, Korb, all of Fed. Rep. of Germany

[73] Assignee: Robert Bosch GmbH, Stuttgart, Fed. Rep. of Germany

[21] Appl. No.: 773,901
[22] PCT Filed: Apr. 5, 1991
[86] PCT No.: PCT/DE91/00287
  § 371 Date: Oct. 29, 1991
  § 102(e) Date: Oct. 29, 1991
[87] PCT Pub. No.: WO91/17599
  PCT Pub. Date: Nov. 14, 1991

[30] Foreign Application Priority Data
May 8, 1990 [DE] Fed. Rep. of Germany ....... 4014696

[51] Int. Cl.[5] .................................. H02J 7/00
[52] U.S. Cl. .......................... 320/2; 320/37; 320/44
[58] Field of Search ................ 320/44, 43, 2, 37

[56] References Cited
U.S. PATENT DOCUMENTS

| | | | |
|---|---|---|---|
| 3,955,657 | 5/1976 | Bossi | 320/20 X |
| 4,307,330 | 12/1981 | Belot | 320/44 |
| 4,672,280 | 6/1987 | Honjo | 307/1 X |
| 5,049,802 | 9/1991 | Mintus et al. | 320/2 |
| 5,119,011 | 6/1992 | Lambert | 320/43 |
| 5,144,218 | 9/1992 | Bosscha | 320/44 |

FOREIGN PATENT DOCUMENTS
3832840 3/1990 Fed. Rep. of Germany.

Primary Examiner—R. J. Hickey
Attorney, Agent, or Firm—Michael J. Striker

[57] ABSTRACT

The arrangement for charging an accumulator of a transporting device having its own electric drive at an external charging station having a machining station includes an external control unit for controlling the machining station and the charging, a charge regulating device located in the transporting device and containing a processor with a storage unit, a device for determining an actual charge in the accumulator, and a charging current changing device connected to the processor. The processor is structured to compare the actual charge with at least one charge reference value stored in the storage unit and to act on the charging current changing device so that it changes the charging current so that the accumulator receives at least one of the at least one charge reference values stored in the storage unit; and a signal processing arrangement located in the external charging station and having a device for detecting an action of the charging current changing device on the charging and a device for sending a status signal to the external control unit for each of the at least one charge reference values. In a preferred embodiment two charge reference values are provided, a minimum charge for moving the transporting device to the next charging station and a maximum allowed charge.

22 Claims, 4 Drawing Sheets

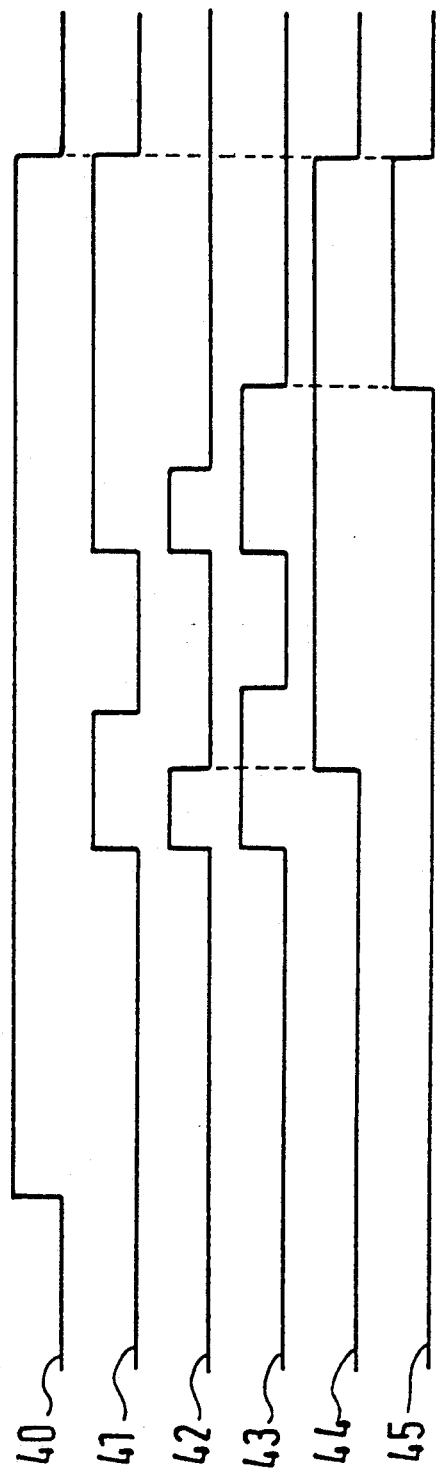

ARRANGEMENT AND METHOD FOR CHARGING AN ACCUMULATOR OF A TRANSPORTING DEVICE COMPRISING AN INDIVIDUAL ELECTRIC DRIVE

BACKGROUND OF THE INVENTION

The present invention relates to an arrangement for charging an accumulator of a transporting device More particularly, it relates to such an arrangement in which the transporting device is moved from one station to the other in a controlled manner and the power coupling to an external charging station is provided for the accumulator. The invention further relates to a method in which the transporting device is moved from one station to the other in a controlled manner, and the accumulator is charged via a power coupling by an external charging station.

A transfer line is known, according to EP-A 285 527, in which workpiece transport cars move from one machining station to the other on a guide path. The machining stations comprise a stopping device in each instance for stopping the workpiece transport car. The workpiece transport car is moved by means of an electric motor which draws its power from an accumulator carried along in the workpiece transport car. When the workpiece transport car is stopped in the machining station, charging contacts which are arranged at the underside of the workpiece transport car and electrically connected with the accumulator are connected with corresponding charging contacts of the charging station arranged in the machining station. The recharging of the accumulator is then effected during the machining in the machining station. No special means are indicated in the aforementioned prior publication for recharging the accumulator as a function of capacity.

It has turned out that a problem in transfer lines supplied by an accumulator consists in that the machining times in the machining stations are not always sufficient for achieving the required charging. For this reason, the dwell time of the workpiece transport car in the machining stations is often determined by the charging time required for achieving the necessary charge of the accumulator. The charging time accordingly unnecessarily prolongs the machining passage of the workpiece transport cars.

In connection with other areas of application, a plurality of arrangements and methods for implementing a recharging of accumulators as a function of the charge state are already known. In all of the known arrangements and methods of this kind the fully charged state of the accumulator is provided as a limiting value for the charging process under the criteria of a rapid charging and prevention of an overcharging of the accumulator.

These arrangements and methods for charging accumulators can accordingly not be applied to the aforementioned problems in accumulators in self-propelled workpiece transport cars in transfer lines.

SUMMARY OF THE INVENTION

It is an object of the present invention to provide an arrangement for charging an accumulator which does not have the above described disadvantages.

According to the invention, the arrangement for charging an accumulator of a transporting device having electric drive means and movable from one station to another in a controlled manner at an external charging station having a machining station, includes a power coupling for coupling the accumulator in the transport device to a charging means when the transport device is at the external charging station; external control means for controlling the machining station and the charging, the external control means not being located in the transporting device and including means for detecting occurrence and termination of machining at the machining station; charge regulating means located in the transporting device and containing a processor, at least one storage unit connected with the processor, means for determining an actual charge of the accumulator, and charging current changing means for changing a charging current passing through the accumulator during charging connected to the processor, wherein the processor is structured to compare an actual charge in the accumulator with at least one charge reference value stored in the at least one storage unit and to act on the charging current changing means so that the charging current changing means changes the charging current so that the accumulator receives at least one of the at least one charge reference values stored in the storage unit; and a signal processing arrangement connecting with the power coupling and located in the external charging station, the signal processing arrangement comprising a pulse recognition means connected to the power coupling, and to the charge current changing means when the transporting device is in the external charge station, and signal shaping means connected to the pulse recognition means, the pulse recognition means having means for generating a trigger signal in response to a change in the charging current and the signal shaping means having means for receiving the trigger signal, means for producing a reference pulse from each of the trigger signals and means for producing status signals for the external control means indicative of the charge state of the accumulator from the reference pulses.

The method of the present invention includes charging the accumulator at the external charging station via a power coupling means connecting the accumulator to the external charging station having an associated machining station when the transporting device is located in the external charging station; comparing an actual charge in the accumulator with a charge reference value in a processor provided in the transporting device to form a comparison result, the charge reference value being at least a minimum charge necessary for the transporting device to reach a next charging station but less than a maximum charge receivable by the accumulator; changing the charging according to the comparison result so that when the actual charge reaches the charge reference value and if a predetermined machining time at the machining station associated with the charging station has then elapsed, terminating the charging.

The invention including the above mentioned device and method has the advantage over the prior art that it enables a recharging of the accumulator as required, wherein this is determined by an energy balance which compares the consumed energy with at least one reference value.

Accordingly, with the present invention, the accumulator of the workpiece transport car can continuously receive a minimum charge which allows it to reach the next charging station. The charging time in the machining stations can accordingly by limited to the time needed for achieving this minimum charge. The dwell time in the machining stations is accordingly dependent on the charging time of the accumulator only in those cases when the minimum charge has not yet been achieved. However, this situation occurs extremely seldom, since machining times which ensure a charging time above the minimum charge also occur in the machining flow.

It is particularly advantageous to inform the external control unit about the charge state of the accumulator regulated by means of the charge regulating means accommodated in the workpiece transport car and to make use of the power coupling between the accumulator and charging station for transmitting information. This is effected by a status signal prepared for every charge reference value and fed to the external control unit.

The minimum char $Q_{min}$ and maximum char $Q_{max}$ are provided as charge reference values so as not to unnecessarily prolong the dwell time in the machining station and so as to protect the accumulators from being overcharged during long machining times.

Moreover, a plurality of charge reference states can be transmitted and evaluated with the indicated simple circuitry.

The pulse recognition can be realized in a simple manner with respect to circuit technology if the current flow with respect to a voltage drop is detected at a sensing resistor. It is advantageous if the trigger signal for pulse recognition is a signal which is inverted relative to the charging current.

An advantageous embodiment further consists in characterizing the reference signals by means of different mark-space ratios.

Further, the invention ensures the possibility of a careful rapid charging of the accumulator. The charging current can be adjusted to high by means of the charge regulating means in the case of high discharge in order to make the workpiece transport car ready for operation quickly. On the other hand, when discharge is low, the charging current can be adjusted to low in order to prevent an overcharging and accordingly a shortened life of the accumulator. Moreover, the charging current can be reduced to a maintenance charge toward the conclusion of the charging, so that the charging capacity of the accumulator can be made use of to the full extent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows the curve of signals in the processing of reference values.

DESCRIPTION OF THE PREFERRED EMBODIMENT

Figure 1:
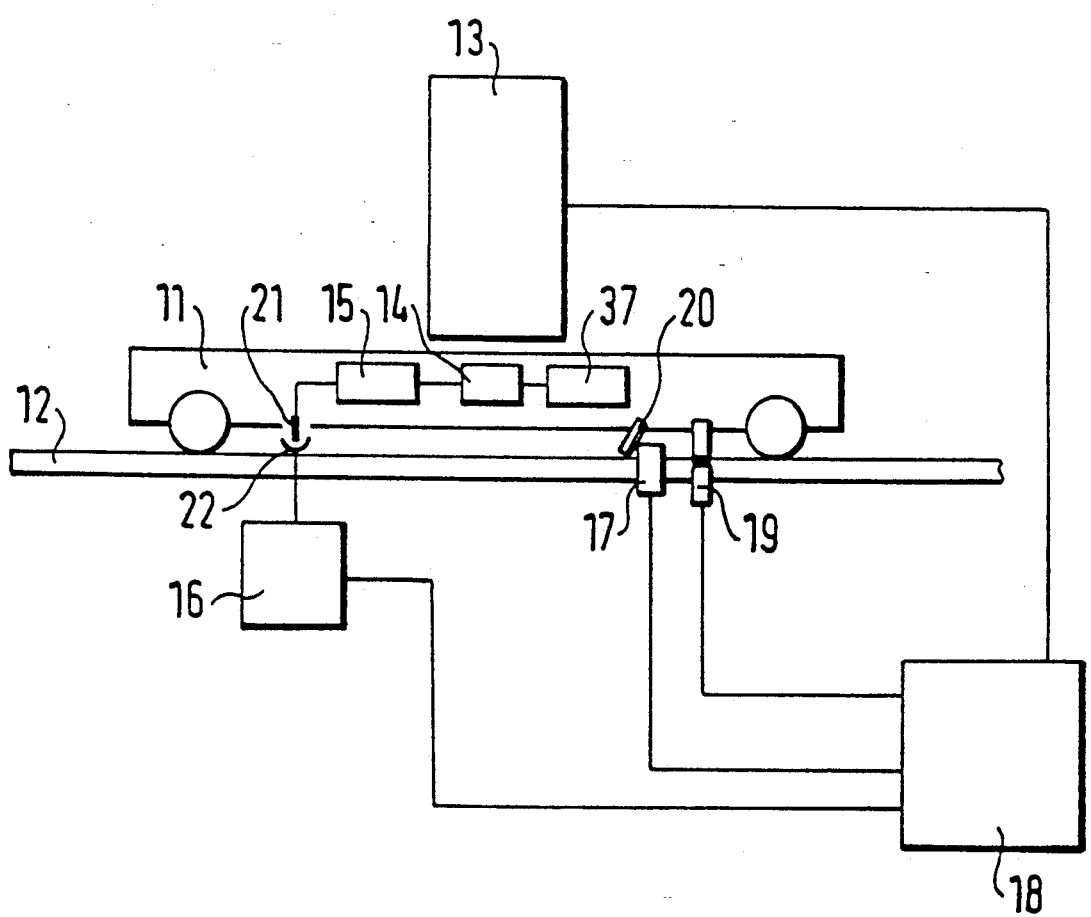
FIG. 1 shows a schematic view of an arrangement, according to the invention, cooperating with a workpiece transport car in a machining station.

FIG. 1 shows a workpiece transport car 11, which moves on a guide path 12, in position in a machining station 13. The position message to the workpiece transport car 11 is effected by means of a position sensor 19 by an external control unit 18, e.g. a storable-program control unit. Stopping in this position is effected by a stop pawl 20 catching in a stopping device 17. The drive of the transport car 14 is effected by means of an electric drive 14, not shown in more detail, which draws its energy from an accumulator 11 which is carried along by the workpiece transport car 11. A charge regulating device 15 is connected to the accumulator 14. The area of the machining station 13 further comprises a charging station 16. The charging station 16 comprises charging contacts 22 which are connected with the charging contacts 21 of the workpiece transport car 11 when the latter 11 is positioned in the machining station, 13. The power coupling of the charging station 16 to the accumulator 14 is effected via the charging contacts 21 and 22.

The charging contacts 21, 22 are constructed with conventional means, e.g. sliding contacts or telescoping contacts. Another advantageous embodiment form of the charging contacts 21, 22 consists in the inductive coupling which is not shown in more detail in the drawing. The external control unit 18 contains control lines to the machining station 13, the stopping device 17, the position sensor 19 and the charging station 16.

Figure 2:
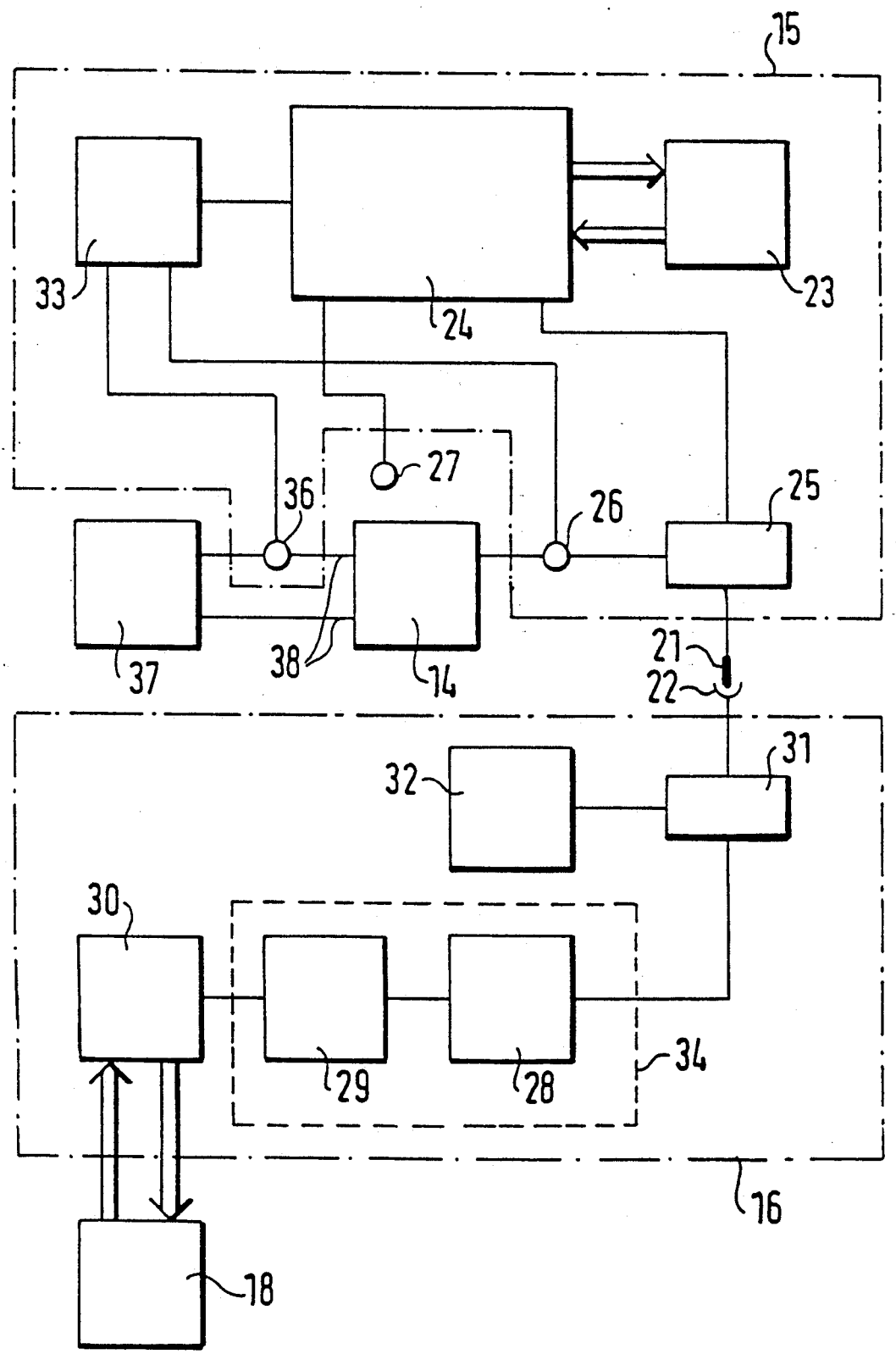
FIG. 2 shows a block wiring diagram of the arrangement, according to the invention.

FIG. 2 shows the charge regulating means 15 accommodated in the workpiece transport car 11 with the accumulator 14 which is to be charged and which supplies the electric drive 37 via the current supply line 38, as well as the charging station 16 which is accommodated in the area of the machining station 13 and communicates with the external control unit.

The charge regulating means 15 comprises a processor 24 which communicates with at least one storage unit 23, a means for determining the actual charge 33 and a charging current changing means 25.

The device for determining the actual charge state 33, e.g. a real-time detection arrangement, adds up the current drawn over time and the charging current supplied and accordingly determines an energy balance. With constant currents, it is sufficient to determine the time period during which the current flows. A first current detector 36 is coupled into the current supply lines 38 between the accumulator 14 and the electric drive 37 and a second current detector 26 is coupled into the supply line between the power coupling and the accumulator 14, each of which detects only the current flow.

The charging time can be determined from the energy balance according to the following formula:

$$T_1 = \frac{I_c \cdot E}{I_1 \cdot \eta},$$

wherein $T_1$ is the charging time, $I_c$ is the drawn current, $I_1$ is the charging current, E is the discharge time, and $\eta$ is the efficiency of the utilized accumulator.

If charging is effected with a variable charging current strength and the current consumption of the electric drive 37 varies, current sensors are used in place of the two current detectors 36, 26. The processor then determines the actual charge state with reference to the two sums.

However, it is also conceivable to determine the actual charge state by measuring the instantaneous accumulator voltage.

Moreover, a temperature monitoring arrangement 27 can be provided as a safety precaution which additionally protects the accumulator 14 from overcharging.

The storage unit 23, e.g. a memory which can be overwritten, comprises three storage locations in the present embodiment example. The determined actual charge state is stored in one storage location. The two additional storage locations serve to receive the charge reference value for the charge of the accumulator.

In the present example, a minimum char $Q_{min}$ and/or maximum char $Q_{max}$ are provided as charge reference values, wherein $Q_{min}$ is the charge which is needed in order for the workpiece transport car 11 to move to the next machining station, and $Q_{max}$ is the charge which represents the fully charged state of the accumulator. An overcharging of the accumulator and accordingly its premature destruction is avoided by indicating the fully charged state.

The charging station contains a charging device 32, an electronic switch 31, a signal processing arrangement 34 and a signal adapting arrangement 30 for communication with the external control unit 18.

The electronic switch 31 serves to switch the charging current on and off when the workpiece transport car 11 is located in position in the processing station 13 and the charging contacts 21, 22 are located in the power coupling.

The signal processing arrangement 34 contains a pulse recognition means 28 which communicates with the power coupling means via the electronic switch 31 and a signal shaping means 29 which transforms the signals transmitted via the power coupling and converted by the pulse evaluating means 28 into status signals and feeds them to the signal adapting arrangement 30.

Figure 3:
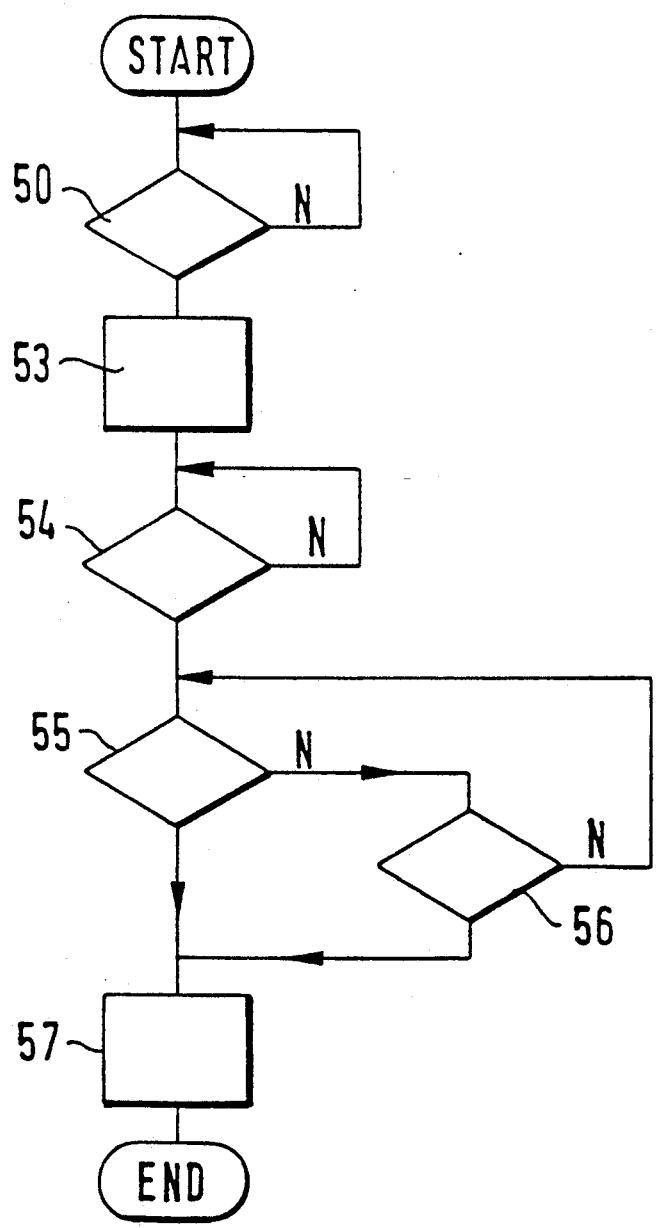
FIG. 3 shows a flow chart of a method, according to the invention.

FIG. 3 shows a flow chart of the method for charging the accumulator 14 for the purpose of a better understanding of the operation of the invention. First, it is determined in step 50 by means of the position sensor 19 whether or not the workpiece transport car 11 is in position in the machining station 13. If the position has been reached and the retaining pawl 20 of the workpiece transport car 11 is stopped in the stopping device 17 of the machining station 13, the power coupling is realized via the charging contacts 21, 22. If the power coupling is present, a start signal 40 (step 53) proceeds from the external control unit 18. The charging process is started simultaneously with the start signal 40 by means of actuating the electronic switch 31.

The step 54 is realized by the processor 24. In so doing, the processor 24 compares the actual charge with the minimum char $Q_{min}$ which is stored in the storage unit 23. If the actual charge reaches the value of $Q_{min}$, the evaluation of the machining status in the machining station 13 is effected in step 55 by the external control unit 18. If the machining has not yet been terminated, the actual charge of the accumulator 14 is compared with the maximum char $Q_{max}$ by the processor 24 (step 56). In the event that the machining has already been terminated, the dwell period in the charging station is not prolonged by extending the charging process until achieving $Q_{max}$. In the event that the machining has been terminated and/or $Q_{max}$ has been reached, the start signal 40 is withdrawn by the external control unit 18 in step 57. The status signals are then reset to their initial state. The charging current is blocked by means of actuating the electronic switch 31. When the power coupling of the charging contacts 21, 22 is interrupted, the external control unit 18 has acknowledgement that the workpiece transport car 11 can leave the machining station 13.

The signal curve is illustrated as follows with reference to FIG. 4. As has already been explained, a start signal 40 is triggered when positioning the workpiece transport car 11 in the machining station 13. The charging current flows to the accumulator 14 via the charging contacts 21, 22.

As soon as the actual charge has reached the value of the minimum char $Q_{min}$, the device for influencing the charging process 25 is actuated by the processor 24, which reduces the charging current to e.g. 100 mA in the present embodiment example. But it is also conceivable to switch off the charging current entirely. When reaching $Q_{min}$, the charging current is only temporarily reduced, e.g. to 10 ms in the present embodiment example. When the charging process reaches $Q_{max}$, the charging current is reduced e.g. to 100 mA for the entire remaining charging period. Accordingly, a maintenance charging which does not lead to an overcharging of the accumulator is effected simultaneously.

The limiting of the charging current is recorded by the pulse recognition arrangement 28 and a signal $I_{off}$ 41 is switched. The signal $I_{off}$ 41 is e.g. a binary signal with the states 1-0 and is inverted relative to the charging current.

A reference pulse is generated for every 0-1 flank of the signal $I_{off}$ 41 by the signal shaping means 29 for every stored charge reference value. These are likewise binary signals with having 1-0 states. In the present embodiment example, a corresponding reference pulse $S_{min}$ 42 and $S_{max}$ 43 is produced for every 0-1 flank of the signal $I_{off}$ 41. The duration of the two reference pulses $S_{min}$ and $S_{max}$ is different and is fixed. They are e.g. 7 ms for $S_{min}$ and e.g. 15 ms for $S_{max}$.

The signal shaping means 29 has the additional task of forming the respective status signals from the reference pulses assigned to the reference values in order to reach a conclusion from the latter about the actual charge. The processing of the signals $I_{off}$, $S_{min}$ and $S_{max}$ is effected in the signal shaping arrangement 29 according to the following logical AND operations:

$I_{off}$  $S_{min}$ $I_{off}$  $S_{max}$

A binary status signal is set by the signal shaping means 29 for each charge reference value by means of these logical operations. In the present embodiment example, this is the status signals MIN 44 and MAX 45 for charge reference values $Q_{min}$ and $Q_{max}$. The two connected status signals MIN and MAX remain stored until the external control unit 18 resets the start signal.

The status signals MIN and MAX switched by the signal evaluating arrangement 29 are fed to the external control unit 18 via the signal adapting means 30. They are included in the process control unit as the signals assigned to charge the reference values $Q_{min}$ and $Q_{max}$ to be processed. The signal adapting arrangement 30 provides a coupling between the charging station 16 and the external control unit 18 without direct electrical connection and is realized e.g. by means of optocouplers, not shown in the drawing.

It will be understood that each of the elements described above, or two or more together, may also find a useful application in other types of constructions and methods differing from the types described above.

While the invention has been illustrated and described as embodied in an arrangement and method for charging an accumulator of a transporting device comprising an individual electric drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An arrangement for charging an accumulator of a transporting device having electric drive means and being movable from one station to another in a controlled manner at an external charging station having a machining station, the arrangement comprising a power coupling for coupling the accumulator in the transport device to a charging means when the transport device is at said external charging station;

external control means for controlling the machining station and the charging, said external control means not being located in the transporting device and including means for detecting occurrence and termination of machining at said machining station;

charge regulating means located in the transporting device and containing a processor, at least one storage unit connected with said processor, means for determining an actual charge of the accumulator, and charging current changing means for changing a charging current passing through the accumulator during charging connected to said processor, wherein said processor is structured to compare an actual charge in the accumulator with at least one charge reference value stored in said at least one storage unit and to act on said charging current changing means so that said charging current changing means changes said charging current so that the accumulator receives at least one of the at least one charge reference values stored in said storage unit; and a signal processing arrangement connected with the power coupling and located in said external charging station, said signal processing arrangement containing a pulse recognition means connected to the power coupling, and to said charge current changing means when the transporting device is in the external charge station, and signal shaping means connected to the pulse recognition means, said pulse recognition means having means for generating a trigger signal in response to a change in said charging current and said signal shaping means having means for receiving said trigger signal, means for producing a reference pulse from each of said trigger signals and means for producing status signals for said external control means indicative of the charge state of the accumulator from said reference pulses.

2. An arrangement as defined in claim 1, further comprising a shut off switch connected to control said charging current, and wherein said charging current changing means operates said shut off switch to shut off the charging current when said accumulator receives a minimum charge required for reaching a next external charging station.

3. An arrangement as defined in claim 1, wherein said trigger signal is a signal $I_{off}$ and said signal $I_{off}$ is inverted relative to said charging current.

4. An arrangement as defined in claim 1, wherein said signal shaping means contains flip-flops.

5. An arrangement as defined in claim 1, further comprising a signal adapting arrangement electrically connected to said signal processing arrangement and coupled to said external control means.

6. An arrangement as defined in claim 5, wherein said signal adapting arrangement includes optocouplers so that said external control means is not electrically connected to said signal processing arrangement but is coupled thereto via said optocouplers.

7. An arrangement as defined in claim 1, wherein said storage unit is structured to contain two of said at least one charge reference values, and said two charge reference values consist of a minimum charge and a maximum charge for said accumulator.

8. An arrangement as defined in claim 3, wherein said storage unit is structured to contain two of said at least one charge reference values, and said two charge reference values consist of a minimum charge and a maximum charge for said accumulator; and wherein said signal shaping means is structured to perform a logical AND operation between said signal $I_{off}$ and an inverted one of said reference pulses and to perform another logical AND operation between said signal $I_{off}$ and another inverted one of said reference pulses.

9. An arrangement as defined in claim 1, wherein said at least one storage unit comprises memory means, said memory means being structured so as to be overwritten.

10. An arrangement as defined in claim 1, wherein said at least one storage unit is structured so that said actual charge is stored therein.

11. An arrangement as defined in claim 1, wherein said means for determining said actual charge in said accumulator is a real time recognition arrangement comprising a first current detection means for measuring a first current drawing from said accumulator by said electric drive means and a second current detection means for measuring a second current supplied to said accumulator and means for integrating said first and second currents over time to determine said actual charge in said accumulator.

12. Method of charging an accumulator of a transporting device having electric drive means and being movable from one station to another in a controlled manner by an external charging station having an associated machining station, said method comprising the steps of charging the accumulator by the external charging station when the transporting device is located in the external charging station; comparing an actual charge in the accumulator with a charge reference value in a processor provided in the transporting device to form a comparison result, said charge reference value being at least a minimum charge necessary for the transporting device to reach a next charging station but less than a maximum charge receivable by the accumulator without overcharging; changing said charging according to said comparison result so that, when said actual charge reaches said charge reference value and if a predetermined machining time at said machining station associated with said charging station has then elapsed, said charging is terminated.

13. Method of charging as defined in claim 12, wherein said charge reference value is equal to said minimum charge necessary to reach said next changing station.

14. Method of charging as defined in claim 12, further comprising the steps of generating in a signal processing means a status signal associated with the charge reference value and feeding the status signal from the signal processing device to an external control unit determining a dwell time of the transporting device at said charging station.

15. Method of charging as defined in claim 14, further comprising the steps of providing a power coupling means between the transporting device and the external charging station and using a current flowing through the power coupling means to control said power coupling means.

16. Method of charging as defined in claim 15, further comprising providing means for switching off said current flowing through said power coupling.

17. Method of charging as defined in claim 12, further comprising determining said actual charge, said actual charge being determined by energy balance from an integration of current drawn from said accumulator over time and current supplied to said accumulator over time.

18. Method of charging as defined in claim 12, further comprising, when a charging current is constant over time and a drawn current is constant over time, determining a charging time according to the equation:

$$T_1 = (I_c E)/(I_1 n)$$

wherein $T_1$ is the charging time to reach said minimum charge $I_1 T_1$, $I_c$ is said drawn current, E is said discharge time, $I_1$ is said charging current and n is an efficiency of said accumulator.

19. Method of charging as defined in claim 12, wherein said charge reference value is equal to said minimum charge, and further comprising also comparing said actual charge to another charge reference value equal to a maximum charge receivable by said accumulator without overcharging, and further changing said charging so that, when said accumulator receives said charge reference value and if said predetermined machining time at said machining station has not elapsed, said charging continues until said other charge reference value has been reached provided said predetermined machining time has not elapsed and then is terminated.

20. Method of charging as defined in claim 19, further comprising generating a trigger signal in response to a change in charging current associated with each of said charge reference values; switching a reference pulse when each of said trigger signals is generated; and generating said status signals by combining said trigger signals and said reference pulses.

21. Method of charging as defined in claim 20, wherein said generating of said status signals occurs by combining negated ones of said reference pulses with said trigger signals with a logical AND operation.

22. Method of charging as defined in claim 12, further comprising the step of storing said charge reference value and said actual charge in a storage unit.

* * * * *